US007395327B2

(12) United States Patent
Bae et al.

(10) Patent No.: US 7,395,327 B2
(45) Date of Patent: Jul. 1, 2008

(54) PERSISTENT GROUP MEMBERSHIP IN A DISTRIBUTED COMPUTING SYSTEM

(75) Inventors: Myung M. Bae, Pleasant Valley, NY (US); Jifang Zhang, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 961 days.

(21) Appl. No.: 10/741,363

(22) Filed: Dec. 19, 2003

(65) Prior Publication Data

US 2005/0160143 A1 Jul. 21, 2005

(51) Int. Cl.
*G06F 15/16* (2006.01)
*G06F 15/173* (2006.01)

(52) U.S. Cl. ........................ 709/223; 709/204; 709/205; 709/224; 709/226; 709/229

(58) Field of Classification Search ....................... None
See application file for complete search history.

(56) References Cited

U.S. PATENT DOCUMENTS

| | | | | |
|---|---|---|---|---|
| 6,216,150 | B1 | 4/2001 | Badovinatz et al. | |
| 6,330,605 | B1 * | 12/2001 | Christensen et al. | 709/226 |
| 6,363,495 | B1 | 3/2002 | MacKenzie et al. | |
| 6,411,967 | B1 | 6/2002 | Van Renesse | |
| 6,427,163 | B1 * | 7/2002 | Arendt et al. | 709/201 |
| 6,532,494 | B1 | 3/2003 | Frank et al. | |
| 6,801,949 | B1 * | 10/2004 | Bruck et al. | 709/232 |
| 7,039,694 | B2 * | 5/2006 | Kampe et al. | 709/222 |
| 2002/0073153 | A1 | 6/2002 | Miller | |
| 2002/0078263 | A1 | 6/2002 | Darling et al. | |
| 2003/0005102 | A1 | 1/2003 | Russell | |
| 2003/0041138 | A1 | 2/2003 | Kampe et al. | |
| 2003/0055892 | A1 | 3/2003 | Huitema et al. | |
| 2004/0123183 | A1 * | 6/2004 | Tripathi et al. | 714/31 |

FOREIGN PATENT DOCUMENTS

JP 11167558 A 12/1998

* cited by examiner

*Primary Examiner*—John Follansbee
*Assistant Examiner*—Hassan Phillips
(74) *Attorney, Agent, or Firm*—Lawrence D. Cutter; Jon A. Gibbons; Fleit Gibbons Gutman Bongini & Bianco P.L.

(57) ABSTRACT

A distributed system has a multiplicity of nodes. A group of the nodes subscribe to a group services process. The group is subject to dissolving. A list of persistent subscribers to the group is maintained. Subscriptions to members and states of the group that are persistent subscribers do not terminate in response to the group being dissolved. The persistent subscribers automatically receive a notice in response to the group being reestablished and do not need to re-subscribe to the group.

9 Claims, 8 Drawing Sheets

PERSISTENT GROUP MEMBERSHIP IN A DISTRIBUTED COMPUTING SYSTEM

FIELD OF THE INVENTION

This invention relates in general to the application of distributed computing system environments, and in particular to memberships and states of one or more groups in the system.

BACKGROUND OF THE INVENTION

The present invention is generally directed to the monitoring of memberships and the states of one group or groups in a single system or a cluster system or cluster systems, such as in a multi-node computer system and its application to a number of such environments including its application to Group Services.

A group is an abstract collection of the specific entities like network adapters, cluster nodes, or distributed application processes in a clustered system. For example, an Ethernet adapter group represents a set of all Ethernet adapters in a cluster, and a cluster-aware application "X" may consist of a set of processes of the application "X" in a cluster.

The membership of the group refers to a set of each element in a group. A membership of an Ethernet adapter group may be a list of IP addresses that are in the cluster. Typically an active (or current) membership refers to the members that are active in a cluster (e.g., UP, reachable, etc). In other words, if a member is in the active membership, it is considered as working, active, reachable, or detectable in the cluster. If not, the member is considered as down, inactive, unreachable, or undetectable.

Many cluster-aware applications subscribe to and monitor the several memberships without joining them, and decide the next action based on the membership changes or state changes. For example, an application subscribes to a network adapter group to monitor the network connectivity. If an adapter is up or down, the application reacts to it.

However, in some cases, if there is no member in the group, the application has to keep trying to subscribe to the group periodically because subscribing to the empty group would fail with the Group Services system.

This periodical re-subscription exposes a serious drawback in performance especially when the system software needs to use the system resource. Furthermore, if an existing group is dissolved, the application's subscription is also dissolved, the application may need to re-subscribe to the group. This adds software logic complexity.

Thus, what is needed is an improved system and method that eliminates the need to re-subscribe to a group after a group member becomes inactive or after the group is dissolved. Furthermore, the improved system and method should be compatible with existing group membership systems.

Additional features and advantages are realized through the techniques of the present invention. Other embodiments and aspects of the invention are described in detail herein and are considered a part of the claimed invention.

SUMMARY OF THE INVENTION

A distributed system has a multiplicity of nodes. A group of the nodes subscribe to a group services process. The group is subject to dissolving. A list of persistent subscribers to the group is maintained. Subscriptions to members and states of the group that are persistent subscribers do not terminate in response to the group being dissolved. The persistent subscribers automatically receive a notice in response to the group being reestablished and do not need to re-subscribe to the group.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

DETAILED DESCRIPTION OF THE INVENTION

In accordance with the present invention a system and method for persistent subscription of membership in one or more groups and states for a single system or a cluster system or cluster systems is provided. The method provides a way to subscribe to a group membership and states persistently. If a client subscribes to a group which does not exist, its subscription will still be valid. The client will be notified that group does not exist. Later when the group is established the system will send a notification to the client to notify the client of the membership and state changes. If a group in which a client subscribed is dissolved the subscriber will be notified that the group is dissolved but the subscription will not be dissolved. The subscription is still valid and later when the group is established again the system will send a notification to the subscriber to notify the subscriber that the group is established, the membership, state and any other changes.

This invention advantageously prevents the need to check the continuous existence of the group or groups and provides persistent subscribing or monitoring the memberships and states of a group or groups. Dissolution of the monitoring can occur after subscribed group is dissolved. Furthermore, it simplifies the writing of application programs.

Non-Persistence Operation

Group Services is a system-wide service that provides a facility for coordinating, managing and monitoring changes to a subsystem running on one or more processors of a distributed computing environment. A more detailed description of Group Services may be included in U.S. Pat. No. 6,216,150 to Badovinatz et al. which is hereby incorporated by reference. Group Services provides an integrated framework for designing and implementing fault-tolerant subsystems and for providing consistent recovery of multiple subsystems. Group Services offers a simple programming model based on a small number of core concepts. These concepts include, in accordance with the principles of the present invention, a cluster-wide process group membership and synchronization service that maintains application specific information with each process group.

As described above, in one example, the mechanisms of the present invention are included in a Group Services facility. However, the mechanisms of the present invention can be used in or with various other facilities, and thus, Group Services is only one example. The use of the term Group Services to include the techniques of the present invention is for convenience only.

Figure 1:
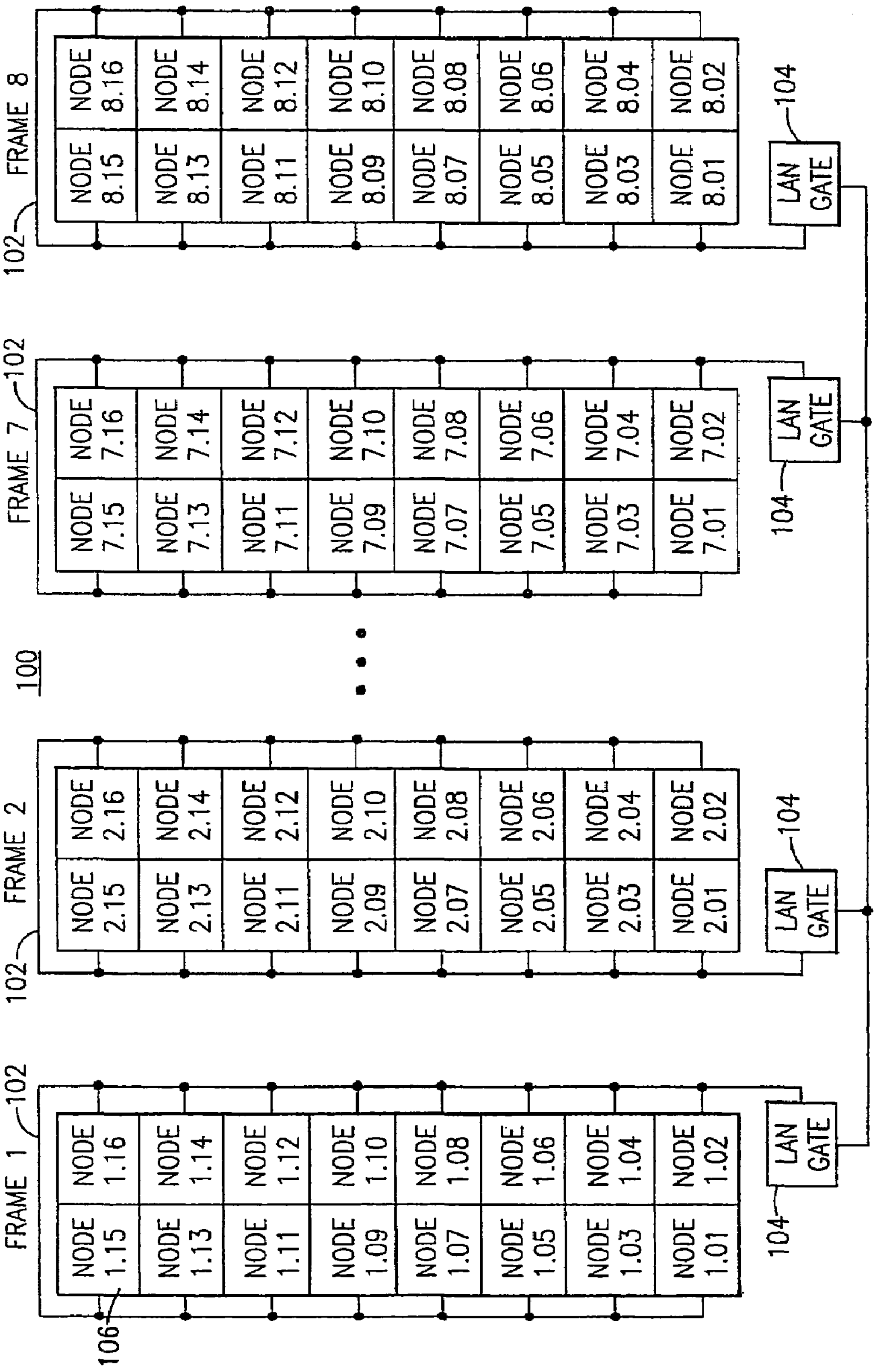
FIG. 1 depicts one example of a distributed computing environment incorporating the principles of the present invention.

In one embodiment, the mechanisms of the present invention are incorporated and used in a distributed computing environment, such as the one depicted in FIG. 1. In one example, distributed computing environment 100 includes, for instance, a plurality of frames 102 coupled to one another via a plurality of LAN gates 104. Frames 102 and LAN gates 104 are described in detail below.

In one example, distributed computing environment 100 includes eight (8) frames, each of which includes a plurality of processing nodes 106. In one instance, each frame includes sixteen (16) processing nodes (a.k.a, processors). Each processing node is, for instance, a RISC/6000 computer running AIX, a UNIX based operating system. Each processing node within a frame is coupled to the other processing nodes of the frame via, for example, an internal LAN connection. Additionally, each frame is coupled to the other frames via LAN gates 104.

As examples, each LAN gate 104 includes either a RISC/6000 computer, any computer network connection to the LAN, or a network router. However, these are only examples. It will be apparent to those skilled in the relevant art that there are other types of LAN gates, and that other mechanisms can also be used to couple the frames to one another.

In addition to the above, the distributed computing environment of FIG. 1 is only one example. It is possible to have more or less than eight frames, or more or less than sixteen nodes per frame. Further, the processing nodes do not have to be RISC/6000 computers running AIX. Some or all of the processing nodes can include different types of computers and/or different operating systems. All of these variations are considered a part of the claimed invention.

Figure 2:
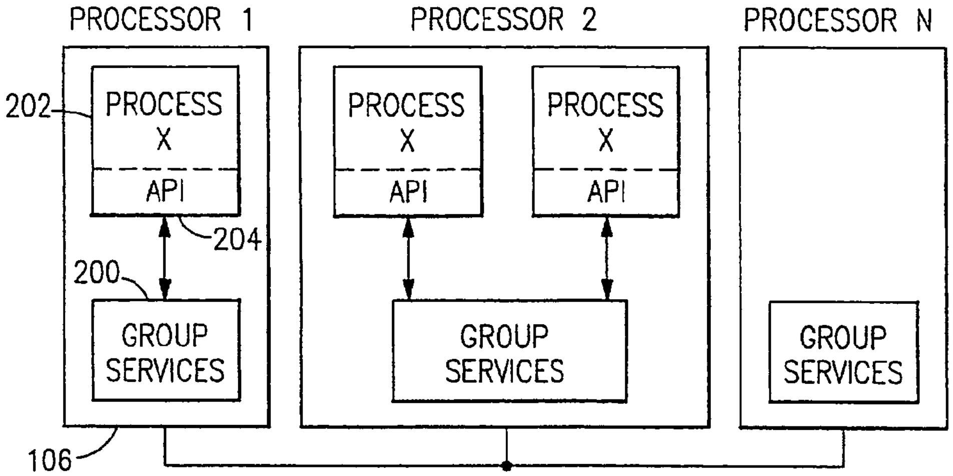
FIG. 2 depicts one example of an expanded view of a number of the processing nodes of the distributed computing environment of FIG. 1, in accordance with the principles of the present invention.

In one embodiment, a Group Services subsystem incorporating the mechanisms of the present invention is distributed across a plurality of the processing nodes of distributed computing environment 100. In particular, in one example, a Group Services daemon 200 (FIG. 2) is located within one or more of processing nodes 106. The Group Services daemons are collectively referred to as Group Services.

Group Services facilitates, for instance, communication and synchronization between multiple processes of a process group, and can be used in a variety of situations, including, for example, providing a distributed recovery synchronization mechanism. A process 202 (FIG. 2) desirous of using the facilities of Group Services is coupled to a Group Services daemon 200. In particular, the process is coupled to Group Services by linking at least a part of the code associated with Group Services (e.g., the library code) into its own code. In accordance with the principles of the present invention, this linkage enables the process to use the mechanisms of the present invention, as described in detail below.

Figure 3:
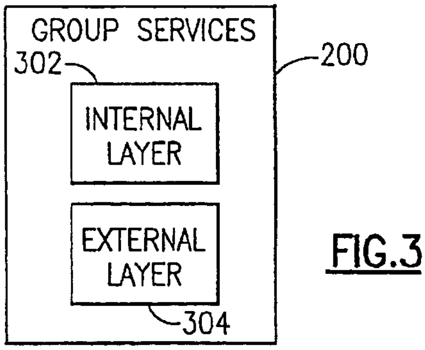
FIG. 3 depicts one example of the components of a Group Services facility, in accordance with the principles of the present invention.

In one embodiment, a process uses the mechanisms of the present invention via an application programming interface 204. In particular, the application programming interface provides an interface for the process to use the mechanisms of the present invention, which are included in Group Services, as one example. In one embodiment, Group Services 200 includes an internal layer 302 (FIG. 3) and an external layer 304, each of which is described in detail below.

In accordance with the principles of the present invention, internal layer 302 provides a limited set of functions for external layer 304. The limited set of functions of the internal layer can be used to build a richer and broader set of functions, which are implemented by the external layer and exported to the processes via the application programming interface. The internal layer of Group Services (also referred to as a metagroup layer) is concerned with the Group Services daemons, and not the processes (i.e., the client processes) coupled to the daemons. That is, the internal layer focuses its efforts on the processors, which include the daemons. In one example, there is only one Group Services daemon on a processing node; however, a subset or all of the processing nodes within the distributed computing environment can include Group Services daemons.

Figure 4:
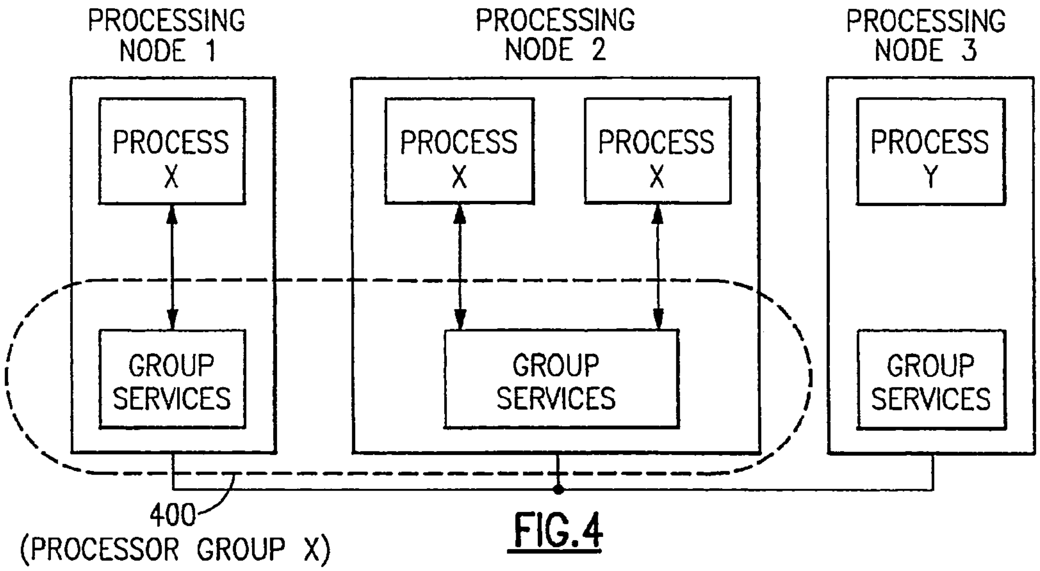
FIG. 4 illustrates one example of a processor group, in accordance with the principles of the present invention.

The internal layer of Group Services implements functions on a per processor group basis. There may be a plurality of processor groups in the network. Each processor group (also, referred to as a metagroup) includes one or more processors having a Group Services daemon executing thereon. The processors of a particular group are related in that they are executing related processes. (In one example, processes that are related provide a common function.) For example, referring to FIG. 4, a Processor Group X (400) includes Processing Node 1 and Processing Node 2, since each of these nodes is executing a process X, but it does not include Processing Node 3. Thus, Processing Nodes 1 and 2 are members of Processor Group X. A processing node can be a member of none or any number of processor groups, and processor groups can have one or more members in common.

In order to become a member of a processor group, a processor needs to request to be a member of that group. In accordance with the principles of the present invention, a processor requests to become a member of a particular processor group (e.g., Processor Group X) when a process related to that group (e.g., Process X) requests to join a corresponding process group (e.g., Process Group X) and the processor is not aware of that corresponding process group.

Since the Group Services daemon on the processor handling the request to join a particular process group is not aware of the process group, it knows that it is not a member of the corresponding processor group. Thus, the processor asks to become a member, so that the process can become a member of the process group. (One technique for becoming a member of a processor group is described in detail further below.) Internal layer 302 (FIG. 3) implements a number of functions on a per processor group basis. These functions include, for example, maintenance of group leaders, insert, multicast, leave, and fail, each of which is described in detail below.

In accordance with the principles of the present invention, a group leader is selected for each processor group of the network. In one example, the group leader is the first processor requesting to join a particular group. As described herein, the group leader is responsible for controlling activities associated with its processor group(s). For example, if a processing node, Node 2 (FIG. 4), is the first node to request to join Processor Group X, then Processing Node 2 is the group leader and is responsible for managing the activities of Processor Group X. It is possible for Processing Node 2 to be the group leader of multiple processor groups.

Figure 5A:
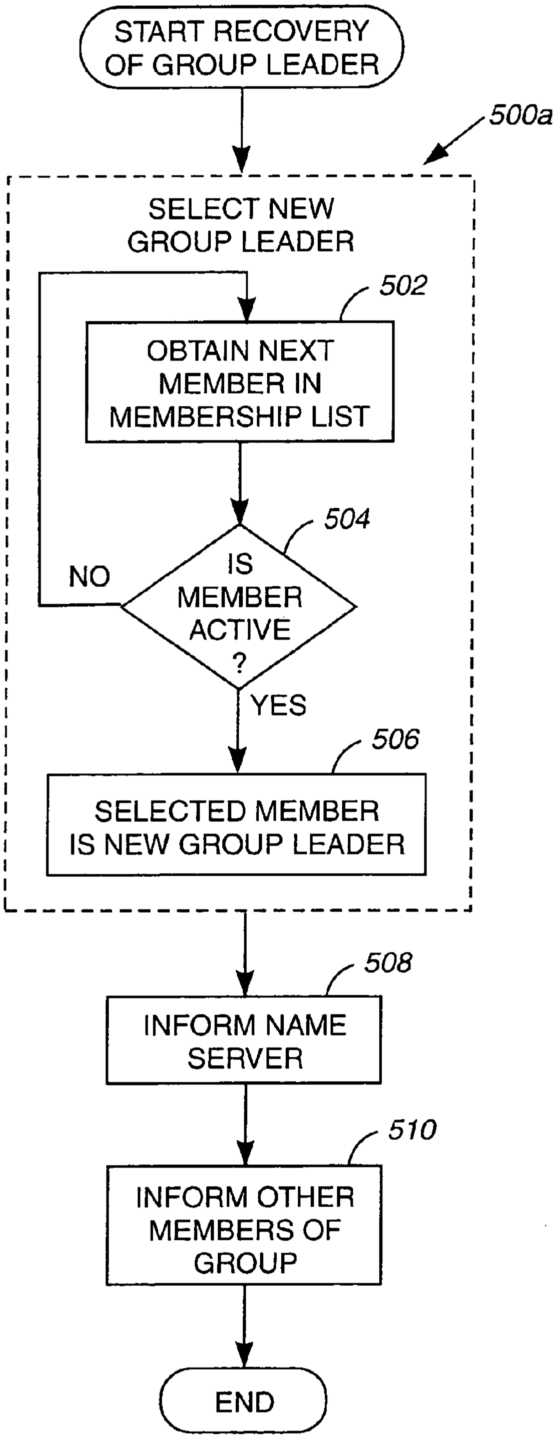
FIG. 5*a* depicts one example of the logic associated with recovering from a failed group leader of the processor group of FIG. 4, in accordance with the principles of the present invention.

If the group leader is removed from the processor group for any reason, including, for instance, the processor requests to leave the group, the processor fails or the Group Services daemon on the processor fails, then group leader recovery takes place. In particular, a new group leader is selected, STEP 500*a* "SELECT NEW GROUP LEADER" (FIG. 5*a*).

In one example, in order to select a new group leader, a membership list for the processor group, which is ordered in sequence of processors joining the group, is scanned, by one or more processors of the group, for the next processor in the list, STEP 502 "OBTAIN NEXT. MEMBER IN MEMBERSHIP LIST." Thereafter, a determination is made as to whether the processor obtained from the list is active, INQUIRY 504 "IS MEMBER ACTIVE?" In one embodiment, this is determined by another subsystem distributed across the processing nodes of the distributed computing environment. The subsystem sends a signal to at least the nodes in the membership list, and if there is no response from a particular node, it assumes the node is inactive.

If the selected processor is not active, then the membership list is scanned, again until an active member is located. When an active processor is obtained from the list, then this processor is the new group leader for the processor group, STEP 506 "SELECTED MEMBER IS NEW GROUP LEADER."

For example, assume that three processing nodes joined Processor Group X in the following order:

Processor 2, Processor 1, and Processor 3.

Figure 6A:
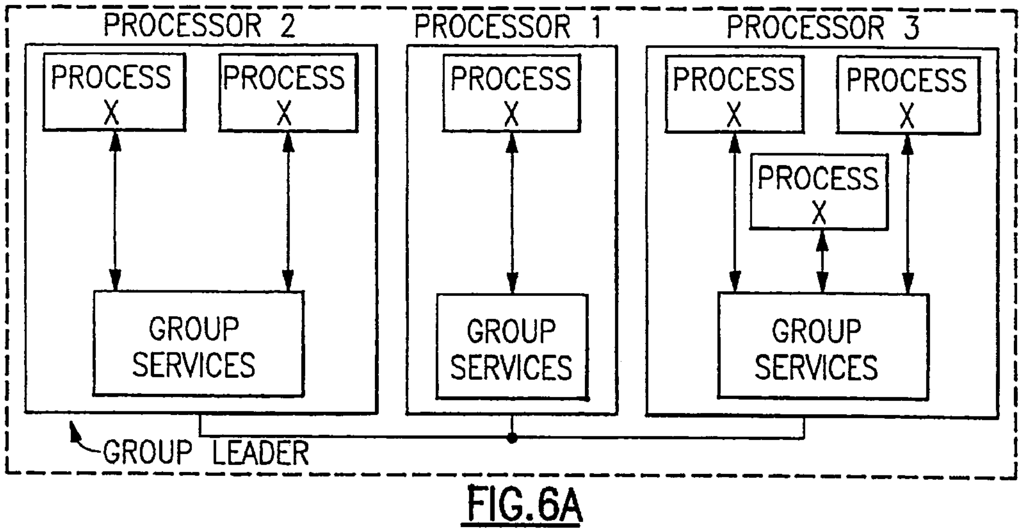
FIG. 6*a* illustrates one example of a group leader, in accordance with the principles of the present invention.
Figure 6B:
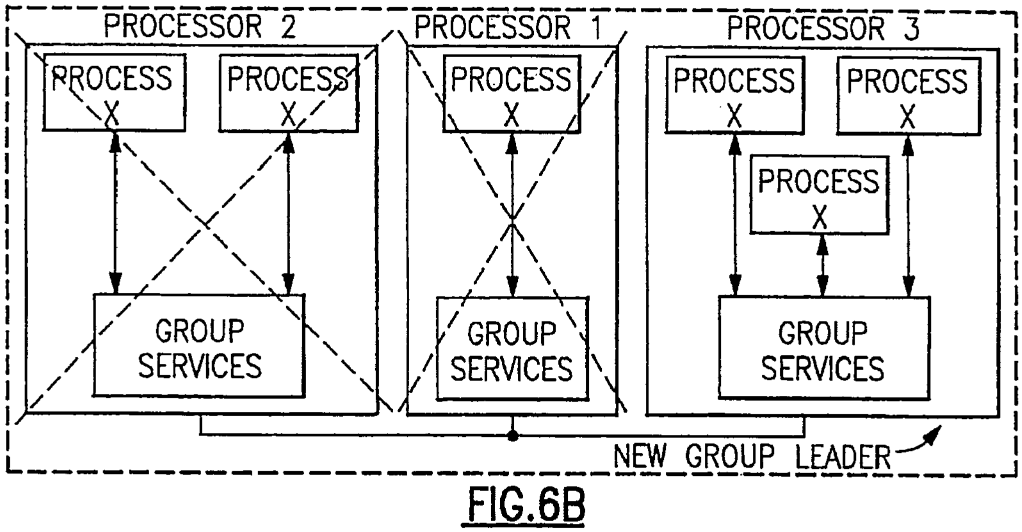
FIG. 6*b* illustrates a technique for selecting a new group leader when the current group leader fails, in accordance with the principles of the present invention.

Thus, Processor 2 is the initial group leader (see FIG. 6*a*). At some time later, Processor 2 leaves Processor Group X, and therefore, a new group leader is desired. According to the membership list for Processor Group X, Processor 1 is the next group leader. However, if Processor 1 is inactive, then Processor 3 would be chosen to be the new group leader (FIG. 6*b*).

In accordance with the principles of the present invention, in one example, the membership list is stored in memory of each of the processing nodes of the processor group. Thus, in the above example, Processor 1, Processor 2, and Processor 3 would all contain a copy of the membership list. In particular, each processor to join the group receives a copy of the membership list from the current group leader. In another example, each processor to join the group receives the membership list from another member of the group other than the current group leader.

Figure 7:
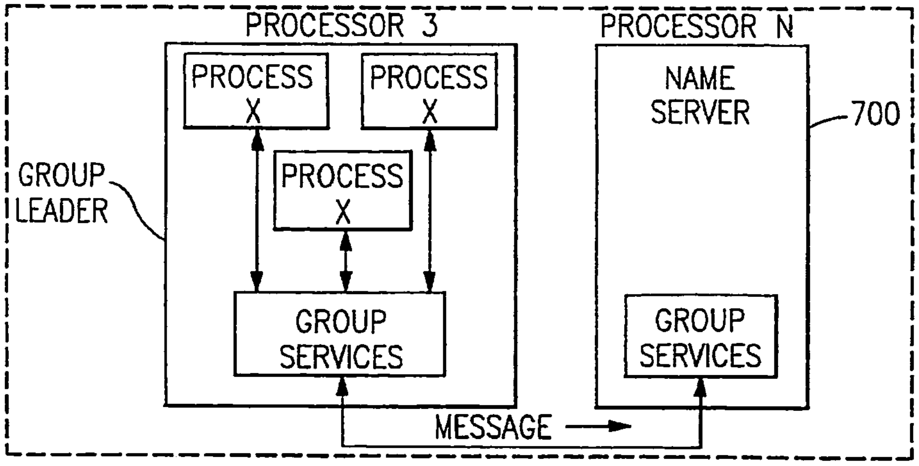
FIG. 7 depicts one example of a name server receiving information from a group leader, in accordance with the principles of the present invention.

Referring back to FIG. 5*a*, in one embodiment of the invention, once the new group leader is selected, the new group leader informs a name server that it is the new group leader, STEP 508 "INFORM NAME SERVER." As one example, a name server 700 (FIG. 7) is one of the processing nodes within the distributed computing environment designated to be the name server. The name server serves as a central location for storing certain information, including, for instance, a list of all of the processor groups of the network and a list of the current group leaders for all of the processor groups. This information is stored in the memory of the name server processing node. The name server can be a processing node within the processor group or a processing node independent of the processor group.

In one example, name server 700 is informed of the group leader change via a message sent from the Group Services daemon of the new group leader to the name server. Thereafter, the name server then informs the other processors of the group of the new group leader via, for example, an atomic multicast, STEP 510 "INFORM OTHER MEMBERS OF THE GROUP" (FIG. 5*a*). (Multicasting is similar in function to broadcasting, however, in multicasting the message is directed to a selected group, instead of being provided to all processors of a system. In one example, multicasting can be performed by providing software that takes the message and the list of intended recipients and performs point to point messaging to each intended recipient using, for example, a User Datagram Protocol (UDP) or a Transmission Control Protocol (TCP). In another embodiment, the message and list of intended recipients are passed to the underlying hardware communications, such as Ethernet, which will provide the multicasting function.) In another embodiment of the invention, a member of the group other than the new group leader informs the name server of the identity of the new group leader. As a further example, the processors of the group are not explicitly informed of the new group leader, since each processor in the processor group has the membership list and has determined for itself the new group leader.

Figure 5B:
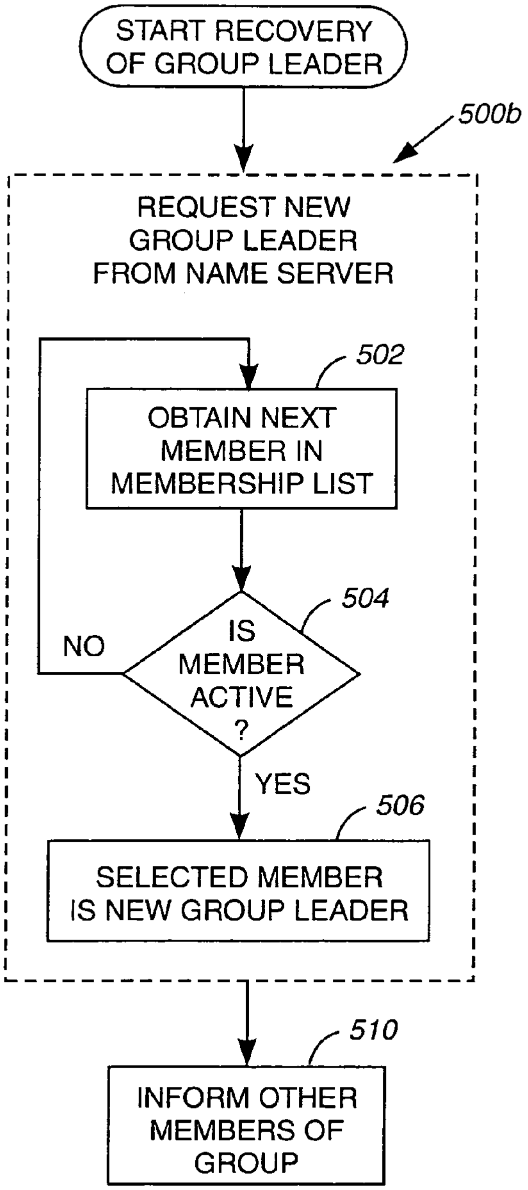
FIG. 5*b* depicts another example of the logic associated with recovering from a failed group leader of the processor group of FIG. 4, in accordance with the principles of the present invention.

In yet another embodiment of the invention, when a new group leader is needed, a request is sent to the name server requesting from the name server the identity of the new group leader, STEP 500*b* "REQUEST NEW GROUP LEADER FROM NAME SERVER" (FIG. 5*b*). In this embodiment, the membership list is also located at the name server, and the name server goes through the same steps described above for determining the new group leader, STEPS 502, 504 and 506. Once it is determined, the name server informs the other processors of the processor group of the new group leader, STEP 510 "INFORM OTHER MEMBERS OF THE GROUP." In addition to the group leader maintenance function implemented by the internal or metagroup layer, an insert function is also implemented. The insert function is used when a Group Services daemon (i.e., a processor executing the Group Services daemon) wishes to join a particular group of processors. As described above, a processor requests to be added to a particular processor group when a process executing on the processor wishes to join a process group and the processor is unaware of the process group.

Figure 8:
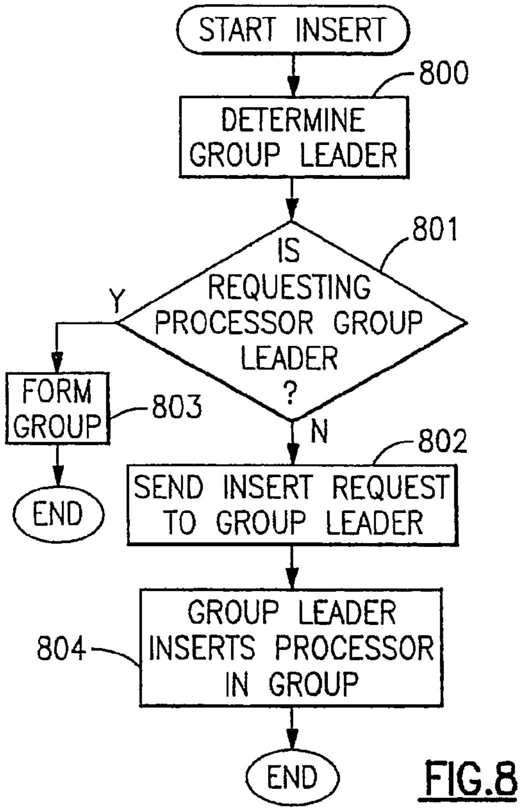
FIG. 8 depicts one example of the logic associated with adding a processor to a group of processors, in accordance with the principles of the present invention.

In one example, in order to become a member of a processor group, the processor wishing to join the group first determines who is the group leader of the processor group, STEP 800 "DETERMINE GROUP LEADER" (FIG. 8). In one embodiment, the group leader is determined by providing name server 700 with the name of the processor group and requesting from the name server the identity of the group leader for that group.

Should the name server respond that the requesting processor is the group leader (since this is the first request for the group), INQUIRY 801, the requesting processor forms the processor group, STEP 803 "FORM GROUP." In particular, it creates a membership list for that particular processor group, which includes the requesting processor.

If the processor is not the group leader, then it sends an insert request, via a message, to the group leader, the identity of which is obtained from the name server, STEP 802 "SEND INSERT REQUEST TO GROUP LEADER." The group leader then adds the requesting processor to the processor group, STEP 804 "GROUP LEADER INSERTS PROCESSOR IN PROCESSOR GROUP." In particular, in one embodiment, the Group Services daemon of the group leader updates its membership list and informs, via a multicast, each other Group Services daemon of the processor group to add the joining processor to the membership list located at that processor. In particular, as one example, the group leader informs the other daemons, via a multicast, of the update, the daemons acknowledge the update, and then the group leader sends out a commit for the change via another multicast. (In another embodiment, the informing can be performed via an atomic multicast.) In one example, the joining processor is added to the end of the membership list, since the list is maintained by order of joins to the group.

Figure 9:
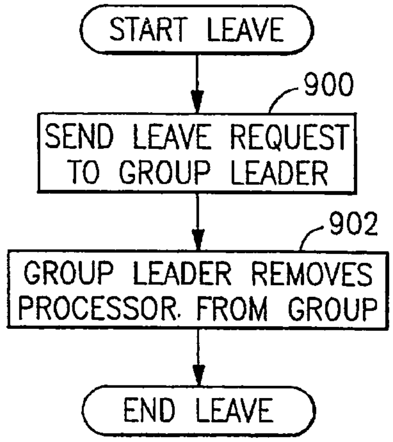
FIG. 9 depicts one example of the logic associated with a processor leaving a group of processors, in accordance with the principles of the present invention.

In accordance with the principles of the present invention, a processor that is a member of a processor group may request to leave the group. Similar to the insert request, a leave request is forwarded to the group leader via, for instance, a message, STEP 900 "SEND LEAVE REQUEST TO GROUP LEADER" (FIG. 9). Thereafter, the group leader removes the processor from the group by, for example, deleting the processor from its membership list and informing all members of the processor group to also remove the processor from their membership list, STEP 902 "GROUP LEADER REMOVES PROCESSOR FROM GROUP." Additionally, if the leaving processor is the group leader, then group leader recovery takes place, as described above.

In addition to the above, if a processor fails, or if the Group Services daemon executing on the processor fails, the processor is removed from the processor group. In one embodiment, when the Group Services daemon fails, it is assumed that the processor fails. In one example, a failed processor is detected by a subsystem running within the distributed computing environment that detects processor failure. When there is a failure, in one instance, the processor is removed by the group leader. In particular, the group leader deletes the processor from its membership list and informs the other member processors to do the same, as described above.

Figure 10:
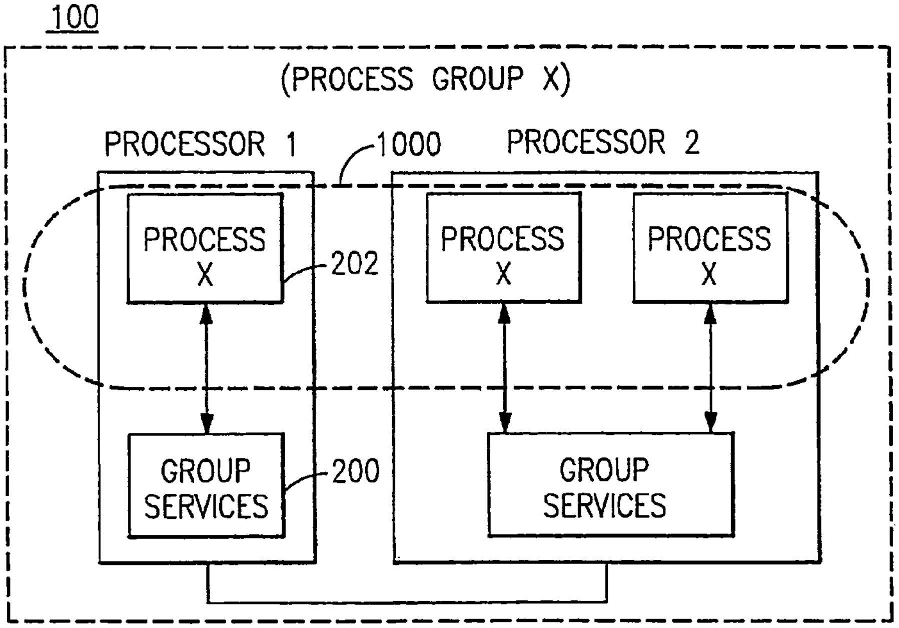
FIG. 10 illustrates one embodiment of a process group, in accordance with the principles of the present invention.

In accordance with the principles of the present invention, the single, unified framework is provided to members of process groups, as described in detail herein. A process group includes one or more related processes executing on one or more processing nodes of the distributed computing environment. For example, referring to FIG. 10, a Process Group X (1000) includes a Process X executing on Processor 1 and two Process X's executing on Processor 2. The manner in which a process becomes a member of a particular process group is described in detail further below.

Process groups can have at least two types of members, including a provider and a subscriber. A provider is a member process that has certain privileges, such as voting rights, and a subscriber has no such privileges. A subscriber can merely watch the on-goings of a process group, but cannot participate in the group. For example, a subscriber can monitor the membership of a group, as well as the state value of the group, but it cannot vote. In other embodiments, other types of members with differing rights can be provided.

In accordance with the principles of the present invention, the above-described protocol is also integrated with process group membership and process group state values. In particular, the mechanisms of the present invention are used to manage and monitor membership and states changes to the process groups. Changes to group membership are proposed via the protocol described above. Additionally, the mechanisms of the present invention mediate changes to the group state value, and guarantee that it remains consistent and reliable, as long as at least one process group member remains.

Persistence Operation

Persistence in the Group Services eliminates re-subscriptions to a group after a group member becomes inactive or after the group is dissolved. The present invention distinguishes subscriber type as a non-persistent subscriber or a persistent subscriber.

For a non-persistent subscriber the subscription will be processed as the aforementioned subscription protocol. If the subscribed group does not exist when the subscription protocol is called the subscriber will receive an error message which indicates the group does not exist and the subscription is failed.

For a persistent subscriber the subscription will be processed as the following. If the subscribed group does not exist the subscriber will receive a notification which indicates that the group does not exist and the number of the members of the group is zero. The subscriber identification and subscription protocol information is saved. A new entry will be created in name server. Later when the group is established by other protocol which makes the numbers of the members of the group is non-zero, then a notification will be sent to the persistent subscriber to give the information about the membership and state of the group.

When a subscribed group is dissolved or the numbers of the members of the subscribed group is zero, a persistent subscriber will receive a notification which indicates that the group is dissolved and the numbers of the members of the group is zero. But the subscription will not be dissolved, the subscriber's identification and the subscription information will be kept as before. While for a non-persistent subscriber the subscription will be dissolved and the non-persistent subscriber will need to re-subscribe after the group is reformed.

Figure 11:
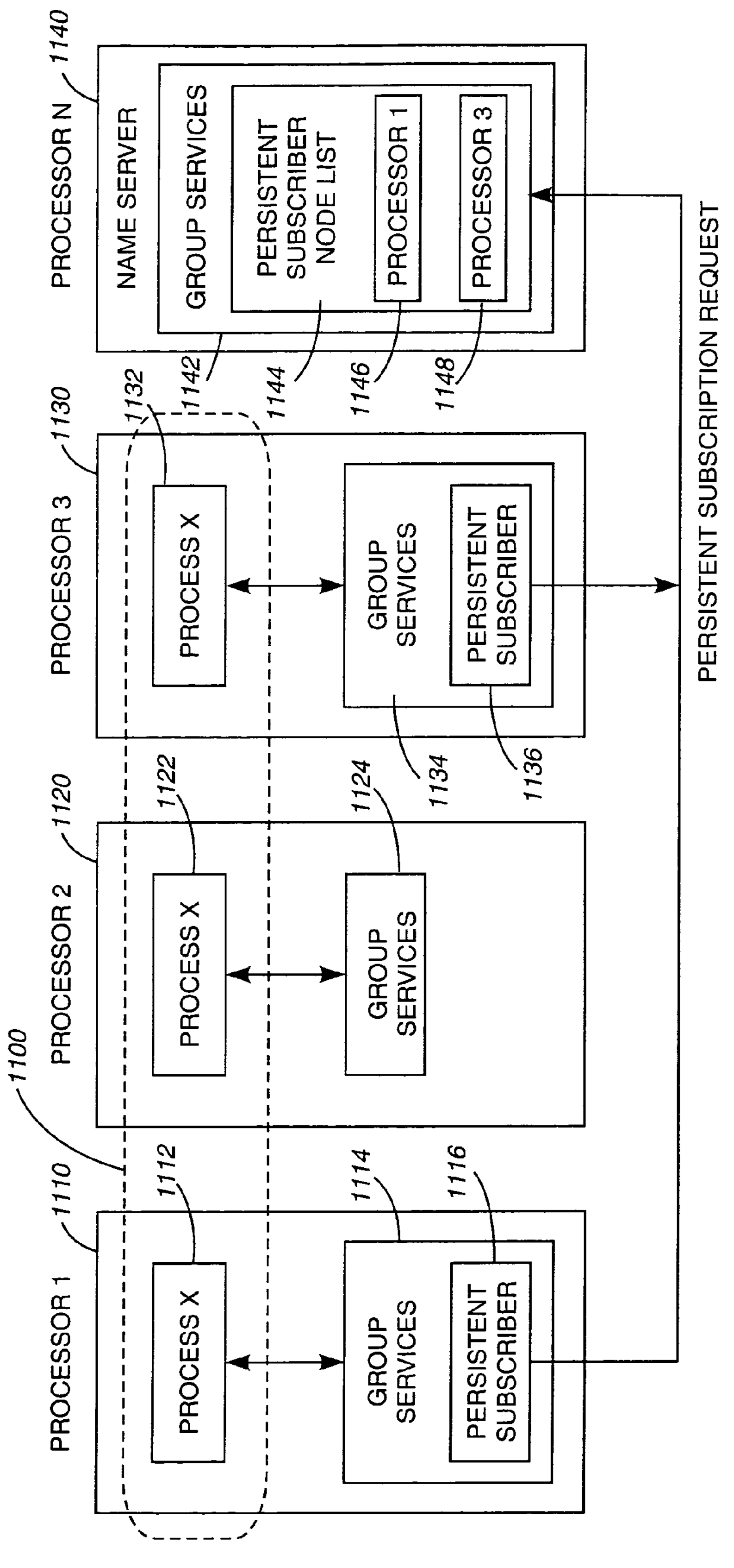
FIG. 11 shows a Processing Group consisting of a non-persistent subscriber node and two persistent subscriber nodes.

FIG. 11 shows a Processing Group 1100 consisting of a non-persistent subscriber node 1120 and two persistent subscriber nodes 1110 and 1130. A name server node 1140 facilitates Group Services and includes a persistent subscriber node list including Processor 1 and Processor 3, 1146-1148 as well as a previously described non-persistent sub-scriber list (not shown). Processor 2, 1120, includes Process X included in Processing Group 1100 and the aforementioned Group Services process 1124 which communicates to the Name Server Group Services task 1142 as previously described with respect to Non-Persistent Operation.

Processors 1 and 2 also run Process X, 1112 and 1132, in Processing Group 1100 using Group Services processes 1114 and 1134, but additionally run the Persistent Subscriber processes 1116 and 1136. The Persistent Subscriber processes send Persistent Subscription Requests which causes the Name Server's Group Services process 1142 to include in the Persistent Subscriber Node List 1144 signals 1146 and 1148 indicative the two processor nodes Processor 1 and Processor 3.

Figure 12:
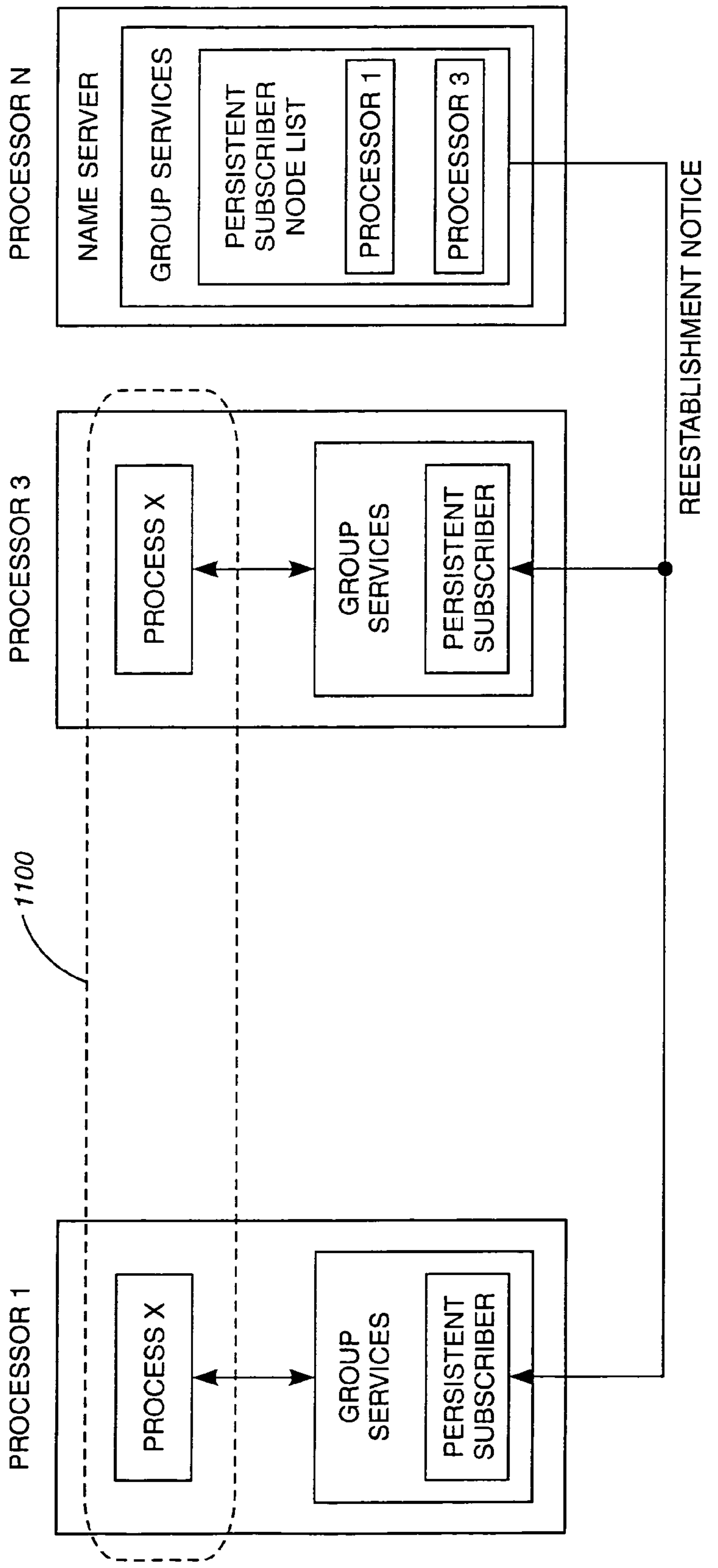
FIG. 12 shows a reestablished Group Services for Processing Group automatically including Persistent Processors 1 and 3.

During Group Services the operation of the system is as previously described. However, upon the processing group dissolving, the operation is enhanced by the Persistent Subscription operation. FIG. 12 shows that upon reestablishing Group Services for Processing Group 1100 a Reestablishment Notice is sent to Processors 1 and 3 by the Name Server because those processors are included in the Persistent Subscriber Node List. Thus, Processors 1 and 3 need not re-subscribe to the Processing Group. However, the subscription of any non-persistent subscriber, Processor 2, does not exist and no notification is sent indicative of the group being reestablished.

Figure 13:
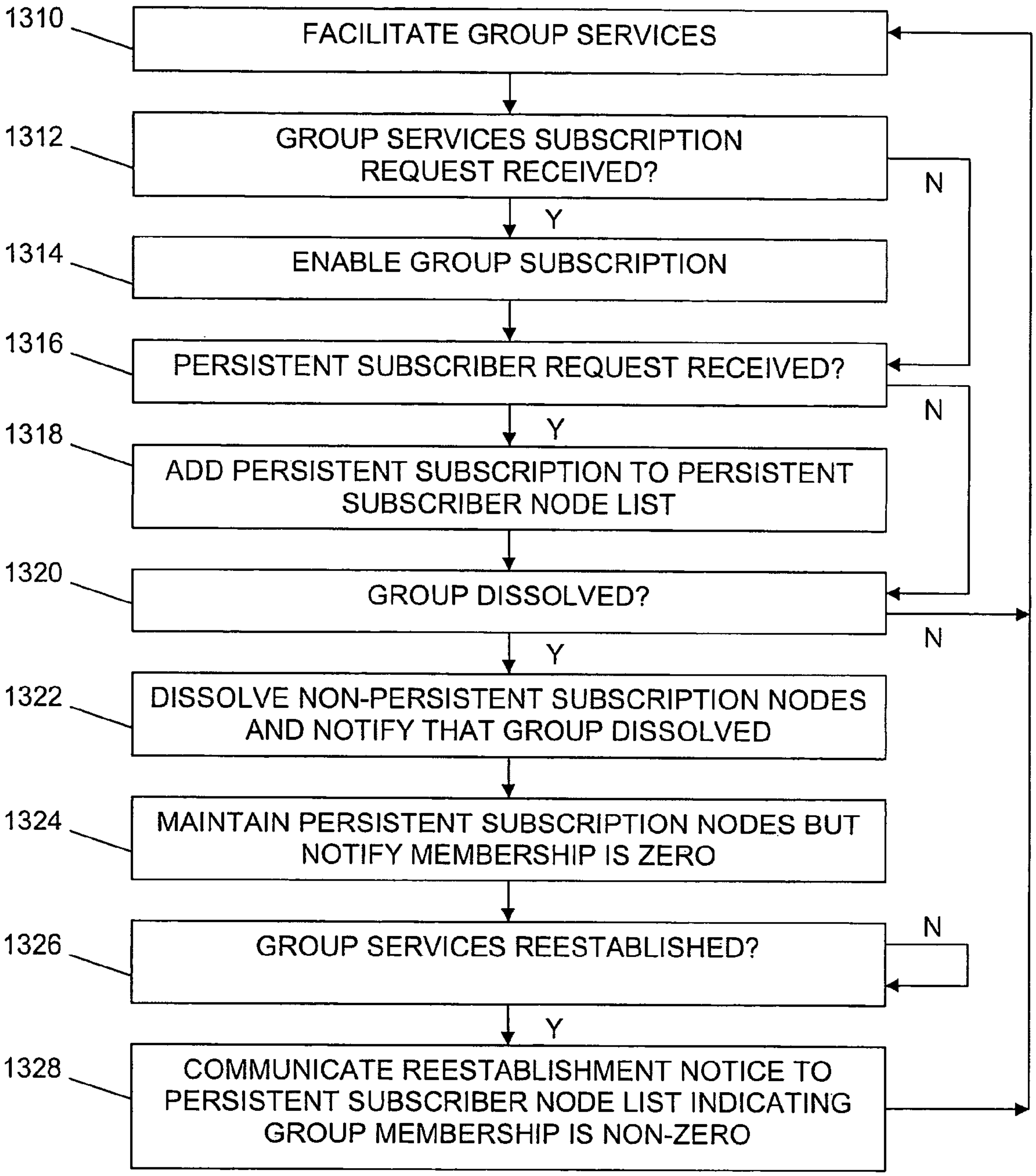
FIG. 13 shows a flow diagram of the processes in the Name Server Node implementing Persistent Subscriptions.

FIG. 13 shows a flow diagram of the processes in the Name Server Node implementing Persistent Subscriptions. The previously described Group Services are facilitated at step 1310. If a Group Services subscription is requested at step 1312 then the subscription is granted at step 1314. If a Persistent Subscriber Request is received at step 1316, then the persistent subscription is added to the Persistent Subscriber Node List at step 1318. If the Group Service group is dissolved at step 1320, then the non-persistent subscription nodes are notified that the group is dissolved at and their corresponding subscriptions are dissolved at step 1322. Alternately, the subscription is maintained for the persistent subscription nodes and those nodes may further receive a notification that the membership is zero. Upon reestablishment of Group Services at step 1326, a reestablishment notice is sent to nodes of the Persistent Subscriber Node List indicating that the membership is no longer zero at step 1328 and the process returns to facilitate Groups Services at step 1310.

Note that Persistent Subscribers (Processors 1 and 3 of FIG. 11 and FIG. 12) have the advantage of not being required to re-subscribe to Group Services when the group is reestablished. This reduces software logic complexity. Further, the need to periodically re-subscribe is eliminated thereby enhancing performance of the system software.

Exemplary Implementations

The present invention can be realized in hardware, software, or a combination of hardware and software in client computers. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

An embodiment of the present invention can also be embedded in a computer program product which comprises all the features enabling the implementation of the methods described herein, and which—when loaded in a computer system—is able to carry out these methods. Computer program means or computer program as used in the present invention indicates any expression, in any language, code or notation, of a set of instructions intended to cause a system having an information processing capability to perform a particular function either directly or after either or both of the following a) conversion to another language, code or, notation; and b) reproduction in a different material form.

A computer system may include, inter alia, one or more computers and at least a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer system to read such computer readable information.

What is claimed is:

1. A method in a distributed computing system, the method comprising:

operating a distribution computing system with a plurality of processing nodes;

running at least one group service program for maintaining groups on at least one of the processing nodes, where each group maintains application specific information for a collection of processing resources, whereby at least two of the processing nodes operate as a plurality of subscriber nodes for subscribing to at least one of the groups as persistent subscriber nodes;

maintaining a persistent subscriber node list of persistent subscriber nodes after the group dissolves so that subscription information is maintained;

dissolving the at least one group so that a number of members in the group is zero; and notifying the persistent subscriber nodes listed in the persistent subscriber node list, in response to a group being reestablished indicating that the number of members of the group is non-zero, thereby eliminating a need for the persistent subscribers to re-subscribe to the group after it has been reestablished.

2. The method according to claim 1 further comprising the steps of:

receiving a persistent subscription request from at least one of the plurality of subscriber nodes; and adding the subscriber node to the persistent subscriber node list in response to the persistent subscription request.

3. The method according to claim 2 wherein the persistent subscriber node list excludes subscriber nodes of the plurality of subscriber nodes where a corresponding persistent subscriber request has not been received.

4. The method according to claim 2 wherein said steps of maintaining, receiving and adding are performed in a first node of the multiplicity of nodes and the method further comprises the step of communicating from one of the plurality of subscriber nodes to the first node the persistent request.

5. The method according to claim 1 further comprising the steps of:

determining a reestablishment of the at least one dissolved group; and communicating a reestablishment notice indicative of the reestablishment to nodes of the persistent subscriber node list.

6. The method according to claim 5 wherein the reestablishment is not communicated to any of the plurality of subscriber nodes not included in the persistent node list.

7. The method according to claim 5 further comprising the steps of:

receiving a persistent subscriber request from at least one of the plurality of subscriber nodes; and adding the node to the persistent subscriber node list in response to the persistent subscriber request.

8. The method according to claim 7 wherein the persistent subscriber node list excludes nodes of the plurality of subscriber nodes where a corresponding persistent subscriber request has not been received and further wherein the reestablishment is not communicated to any of the plurality of subscriber nodes not included in the persistent subscriber node list.

9. The method according to claim 7 wherein said aforementioned steps are performed in a first node of the plurality of subscriber nodes and the method further comprises the steps performed in a second of the plurality of subscriber nodes of:

communicating the persistent subscriber request to the first node;

exiting the dissolvable group in response to the group dissolving;

receiving the reestablishment notice; and automatically rejoining the dissolved group in response thereto.

* * * * *